(12) United States Patent
Kuzminskiy et al.

(10) Patent No.: US 7,391,830 B2
(45) Date of Patent: Jun. 24, 2008

(54) RECEIVER OF DIGITAL DATA BURSTS COMPRISING AN ANTENNA ARRAY, AND A METHOD OF RECEIVING

(75) Inventors: Alexandr Kuzminskiy, Swindon (GB); Constantinos B Papadias, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 698 days.

(21) Appl. No.: 10/669,786

(22) Filed: Sep. 24, 2003

(65) Prior Publication Data
US 2004/0062328 A1    Apr. 1, 2004

(30) Foreign Application Priority Data
Sep. 26, 2002    (EP)    .................................. 02256711

(51) Int. Cl.
*H04B 7/10*    (2006.01)
(52) U.S. Cl. ........................ 375/347; 375/144
(58) Field of Classification Search ................. 375/349, 375/350, 347, 130, 133, 136, 140, 141, 144, 375/147, 148; 370/321, 342, 347
See application file for complete search history.

(56) References Cited

U.S. PATENT DOCUMENTS

| | | | | |
|---|---|---|---|---|
| 5,566,209 A | * | 10/1996 | Forssen et al. ............... | 375/262 |
| 5,621,770 A | * | 4/1997 | Zastera ........................ | 375/347 |
| 5,822,380 A | * | 10/1998 | Bottomley ................... | 375/347 |
| 5,889,825 A | * | 3/1999 | Schreib ....................... | 375/347 |
| 6,115,409 A | * | 9/2000 | Upadhyay et al. ........... | 375/144 |
| 6,408,245 B1 | * | 6/2002 | An et al. ..................... | 701/216 |
| 6,453,308 B1 | * | 9/2002 | Zhao et al. .................... | 706/21 |
| 6,574,293 B1 | * | 6/2003 | Khayrallah et al. ......... | 375/347 |
| 6,609,080 B1 | * | 8/2003 | Syrjarinne ................... | 702/150 |
| 6,668,030 B2 | * | 12/2003 | Kuzminskiy et al. ........ | 375/350 |
| 6,973,144 B1 | * | 12/2005 | Zhu et al. .................... | 375/350 |
| 7,082,174 B1 | * | 7/2006 | Smee et al. .................. | 375/349 |
| 7,092,452 B2 | * | 8/2006 | Taylor et al. ................ | 375/267 |
| 2001/0019575 A1 | * | 9/2001 | Kohno et al. ................ | 375/131 |
| 2006/0280228 A1 | * | 12/2006 | Daniele et al. .............. | 375/142 |

FOREIGN PATENT DOCUMENTS

| | | |
|---|---|---|
| EP | 1 100 211 A1 | 5/2001 |
| EP | 1 152 549 A1 | 11/2001 |
| GB | 2 357 938 A | 7/2001 |

* cited by examiner

*Primary Examiner*—Emmanuel Bayard

(57) ABSTRACT

A receiver of digital data bursts is provided comprising an antenna array, a first space time filter having filter coefficients initialized by estimation over just training data in a received burst and providing symbol estimates and a second space time filter having filter coefficients initialized by estimation over the received burst and providing symbol estimates. In use at least one pass to determine a symbol estimate in the received burst is undertaken by each space time filter and a selector operates to determine which of the first and second filters provides the symbol estimate closer to an expected value.

16 Claims, 5 Drawing Sheets

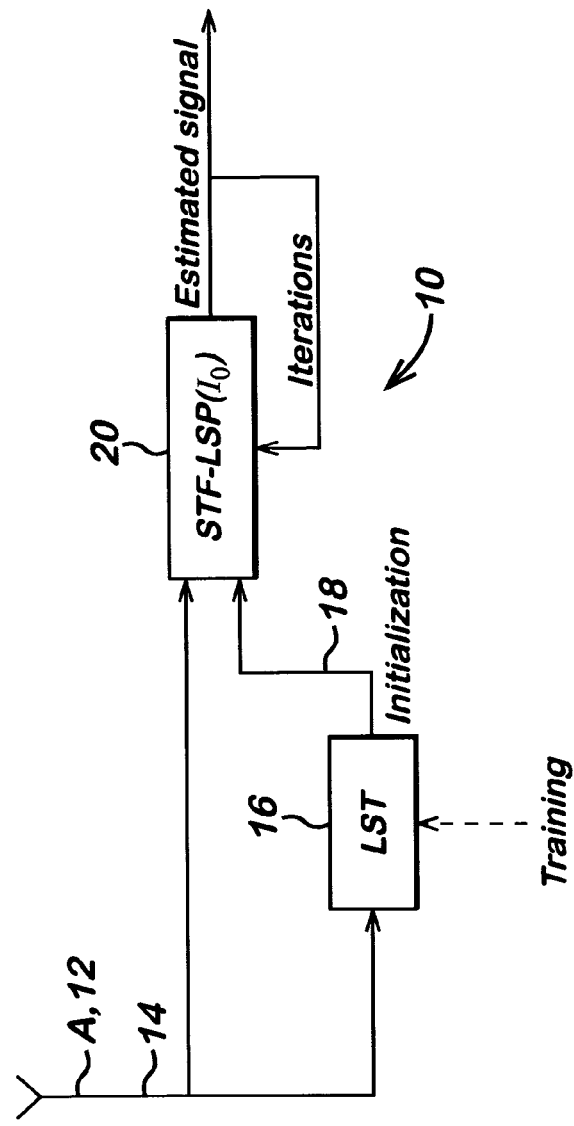
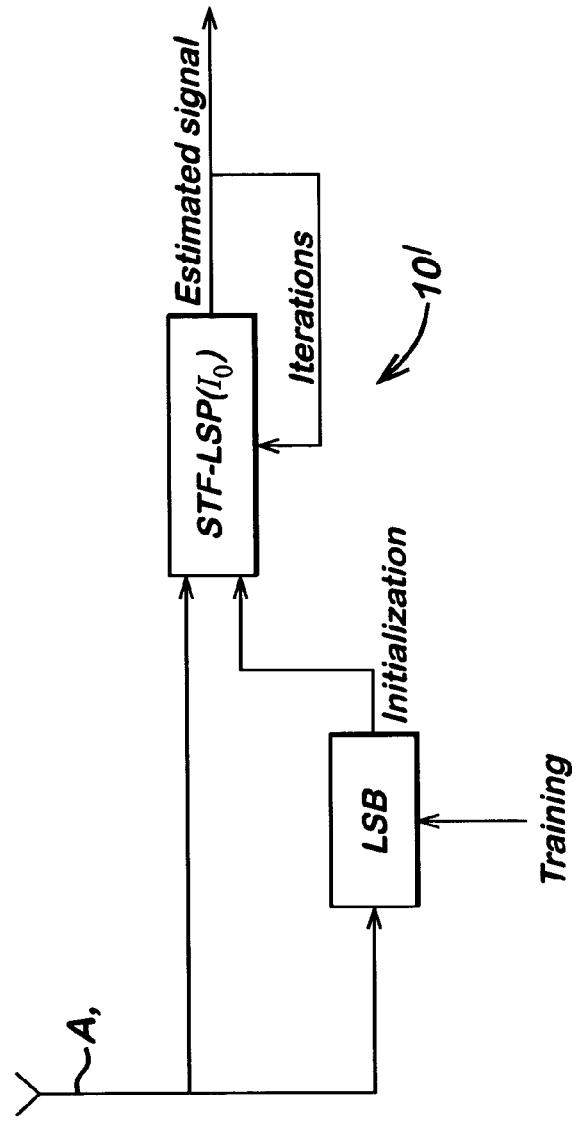
*Fig. 2 Prior Art*
*Fig. 3 Prior Art*

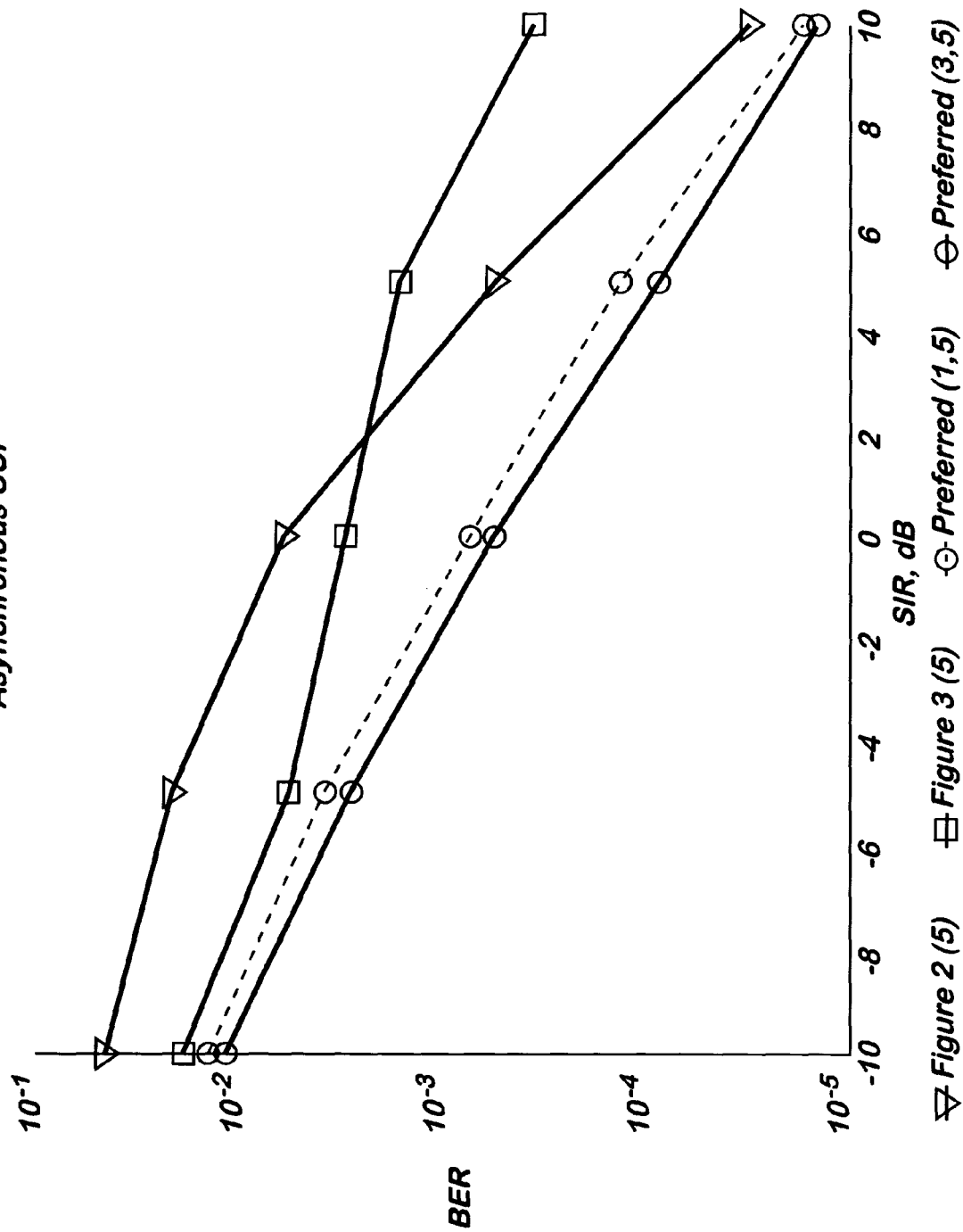

RECEIVER OF DIGITAL DATA BURSTS COMPRISING AN ANTENNA ARRAY, AND A METHOD OF RECEIVING

CROSS REFERENCE TO RELATED APPLICATION

This application claims priority of European Application No. 02256711.9 filed on Sep. 26, 2002.

TECHNICAL FIELD

The present invention relates to a receiver of digital data bursts comprising an antenna array. The present invention also relates to a method of receiving digital data bursts using a receiver comprising an antenna array.

BACKGROUND OF THE INVENTION

Adaptive or smart antennas for base stations have recently become recognized as a powerful tool for capacity and datarates enhancement, mainly because of their co-channel interference (CCI) rejection capability. Usually, timeslot synchronization is assumed between the desired signal and interference. Known antenna array processing techniques can be applied in that case, see for example, Z. Zvonar, P. Jung, L. Kammerlander, (Editors), "GSM evolution towards $3^{rd}$ generation systems", Kluwer Academic Publishers, Boston/Dordreht/London, 1999. This assumption of time slot synchronisation between the desired signal and interference is valid if the neighboring base stations are synchronized and the cells are small. If unsynchronized base stations or large cells are employed, timeslot synchronization between signals is challenging. FIG. 1 shows a typical short burst scenario with (a) synchronous co-channel interference (CCI) and (b) asynchronous co-channel interference (CCI). The desired signal and two-component co-channel interference (CCI) bursts are plotted. In the asynchronous case the co-channel interference (CCI) bursts arrive with the random delay $g_i, i=1, \ldots, M$, where M is the number of the co-channel interference (CCI) components. In the synchronous case all bursts arrive simultaneously, i.e. $g_i=0, i=1, \ldots, M$. Random change of the interference structure during the desired signal burst causes significant performance degradation for known algorithms in the asynchronous case. Such known algorithms are described in the Zvonar reference mentioned above, and also J. Karlsson, "Adaptive antennas in GSM systems with non-synchronized base stations", Licentiate's thesis, Dept. of Signals, Sensors and Systems, Royal Inst. of Technology, Sweden, 1997, and also E. Villier, L. Lopes, S. Aftelak, "On the application of uplink optimum combining to base station reception", in Proc. IEEE $48^{th}$ VTC, pp. 747-752, Ottawa, 1998.

It has been pointed out in M. C. Wells, "Increasing the capacity of GSM cellular radio using adaptive antennas", IEE Proc. Communications, 1996, vol. 143, no. 5, pp. 304-310, that a stationary Space-Time Filter (STF) can be used to equalize the desired signal and reject the asynchronous co-channel interference (CCI) if the dimension of the space time filter (STF) is large enough; where stationary in this context means weight coefficients are fixed over a burst received under stationary propagation channels. The problem is that the known training based weight estimation algorithms, e.g. a Least Squares (LS) estimator, may not be effective because of the burst structure when the training sequence is concentrated in one part of the burst, e.g. the midambles of bursts in systems in accordance with Global System for Mobiles (GSM) or EDGE telecommunications standards, or preambles of bursts in systems in accordance with HIPERLAN/2 telecommunications standard. The GSM midamble case is shown in FIG. 1. One can see from FIG. 1(b) that, for GSM bursts, the training sequence of the desired signal may not even partially overlap with some of the co-channel interference (CCI) components due to other bursts.

One possible solution, which is proposed in the Wells paper mentioned above, is based on using the semi-blind algorithm with projections to the finite alphabet (FA), in other words selection of which of the finite number of symbols (e.g. 2 in a binary modulation scheme, 4 in a Quadrature Phase Shift Keying (QPSK) modulation scheme) was intended. Finite alphabet (FA) projection involves the whole timeslot of the desired signal and can be used for adjusting coefficients of a space time filter (STF) in the asynchronous case. Other semi-blind techniques e.g. based on the Constant Modulus property of the desired signal can also be exploited as described in , A. M. Kuzminskiy, P. Strauch, "Space-time filtering with suppression of asynchronous co-channel interference", in Proc. Symposium 2000: Adaptive Syst. for Signal Proc., Commun., and Control, Lake Louise, October. 2000, and European Patent Publication EP-A-1100211.

FIG. 2 shows the structure of the receiver known from the Wells paper mentioned above with the following notations:

A is a receive antenna of K elements,

LST(which denotes Least Squares estimation over Training data) is the least squares (LS) estimator of the initial space time filter (STF) weight vector over the training interval of the burst, and STF-LSP($I_0$) is the space time filter (STF) adjusted by means of the least squares (LS) algorithm with projections (LSP) to the finite alphabet (FA), where $I_0$ is the number of iterations.

The estimator 10 in FIG. 2 works as follows. A multiple element antenna A, 12 receives the received signal 14 which is an additive mixture of the desired signal and the co-channel interference (CCI). The symbol sampled received signal is collected into data matrix X. The LST estimator block 16 is provided with training data and estimates the weight vector $$\hat{W}_{LST} = \hat{R}_{X_tX_t}^{-1} \hat{P}_{S_tX_t},  \quad \text{(Equation 1)}$$

where $\hat{R}_{X_tX_t}$ and $\hat{P}_{S_tX_t}$ are the correlation matrices of the received signal and the cross correlation vector of the desired and received signals estimated over the training interval, $S_t$ is the vector of the training data and $X_t$ is the input data matrix corresponded to the training interval (sub-matrix of matrix X). These initialising estimates 18 are provided to the space time filter-least squares estimator with projections (STF-LSP ($I_0$)) estimator block 20 which iteratively estimates the vectors of the desired signal based on the least squares (LS) estimation of the weights over the whole burst:

$$\hat{S}^j = Q\{X\hat{W}^{j-1}\}, \quad \text{(Equation 2)}$$

$$\hat{W}^j = \hat{R}_{XX}^{-1} \hat{P}_{S^jX}, j=1, \ldots, I_0, \quad \text{(Equation 3)}$$

where Q is a projector to the finite alphabet (FA) (slicer), $I_0$ is the number of iterations and $\hat{W}^0 = \hat{W}_{LST}$, i.e. the output of the LST estimator block 16 is used for the initialization of STF-LSP($I_0$) as shown in FIG. 2.

The disadvantage of such LST initialization is that it may suffer from insufficient amount of training data overlapping with the asynchronous co-channel interference (CCI) leading to the performance degradation of the iterative receiver in FIG. 2, especially in situations with no overlapping at all.

It has been noted, for example in the Zvonar and Villier papers referred to above, that the training data is not required for estimation of the correlation matrix in Equation 1. Thus the correlation matrix can be calculated over the whole burst of the received signal leading to the modified burst-based estimator (mentioned in the Zvonar paper referred to above) as follows:

$$\hat{W}_{LSB} = \hat{R}_{XX}^{-1} \hat{P}_{S_t X_t}$$ (Equation 4)

This initialisation according to Equation 4 is included in a further known iterative receiver 10' which is shown in FIG. 3. The FIG. 3 system is similar to the one shown in FIG. 2 except as regards the initialization. An advantage of this initialization is that it always contains information about the interference even if there is no overlapping with the training interval of the desired signal. A disadvantage of this solution is that the known least squares (LS) estimator of Equation 1 strictly and significantly outperforms the estimator defined by Equation 4 in the case that the interfering bursts overlap the training data in the signal burst (see for example the references in A. M. Kuzminskiy, "Finite amount of data effects in spatio-temporal filtering for equalisation and interference rejection in short burst wireless communications", Signal Processing, Elsevier, vol. 80, no. 10, pp. 1987-1997, October 2000.).

In the asynchronous scenario illustrated in FIG. 1(*b*) any combination of temporal positions of the desired signal and co-channel interference (CCI) can occur on random basis. Thus, a fixed receiver as shown in FIG. 2 or FIG. 3 may not be suitable for some received bursts of data.

SUMMARY OF THE INVENTION

The present invention provides a receiver of digital data bursts comprising an antenna array, a first space time filter having filter coefficients initialised by estimation over just training data in a received burst and providing symbol estimates and a second space time filter having filter coefficients initialised by estimation over the received burst and providing symbol estimates, in use at least one pass to determine a symbol estimate in the received burst being undertaken by each space time filter and a selector operates to determine which of the first and second filters provides the symbol estimate closer to an expected value.

Preferably the filter giving the symbol estimate closer to the expected value is selected by the selector to continue with at least one further pass to provide an updated symbol estimate to a projector to the finite alphabet so as to enable a decision as to the identity of that symbol to be made.

Preferably for each new received burst, both filters perform at least one pass to determine a respective symbol estimate in the received burst, and the selector operates to determine which of the first and second filters provides the symbol estimate closer to an expected value.

Preferably the estimation by the first filter and the second filter is least squares estimation.

The present invention also provides a terminal for mobile telecommunications comprising the preferred receiver. Preferably the terminal is a base station or a mobile user terminal. Preferably the terminal is operative to receive data bursts sent using Orthogonal Frequency Division Multiplexing (OFDM).

Alternatively preferably the terminal is operative to receive data bursts sent using Time Division Multiple Access (TDMA).

The present invention also provides corresponding methods. The present invention also provides a method of receiving digital data bursts using a receiver comprising an antenna array, a first space time filter having filter coefficients initialised by estimation over just training data in a received burst and providing symbol estimates and a second space time filter having filter coefficients initialised by estimation over the received burst and providing symbol estimates, at least one pass to determine a symbol estimate in the received burst being undertaken by each space time filter, and a selector determining which of the first and second filters provides the symbol estimate closer to an expected value.

Advantages of the present invention in its preferred embodiments include that the capability of a base station or mobile terminal receiver to reject Co-Channel Interference (CCI) is improved, where the base station and user terminal are not synchronized and are equipped with antenna arrays.

Burst-by-burst selection of the appropriate initialization for the space-time filter adjusted by means of the iterative least squares (LS) estimator with projections to the finite alphabet improves the interference rejection capability for base station and/or mobile terminal receivers, which are not synchronized and are equipped with antenna arrays.

In the asynchronous scenario it is particularly beneficial to use a preferred receiver thus adjusted on burst-by-burst basis.

The preferred application areas are Time Division Multiple Access (TDMA) and Orthogonal Frequency Division Multiplexing (OFDM) radio communications systems.

BRIEF DESCRIPTION OF THE DRAWINGS

A preferred embodiment of the present invention will now be described by way of example and with reference to the drawings, in which:

FIG. 2 is a diagram illustrating an iterative receiver initialized from the LST (prior art)

FIG. 3 is a diagram illustrating an iterative receiver initialized from the LSB (prior art), FIG. 6 is a graph representing raw bit error rate (BER) versus signal to interference ratio (SIR) in the asynchronous scenario in FIG. 5.

DETAILED DESCRIPTION

Figure 1:
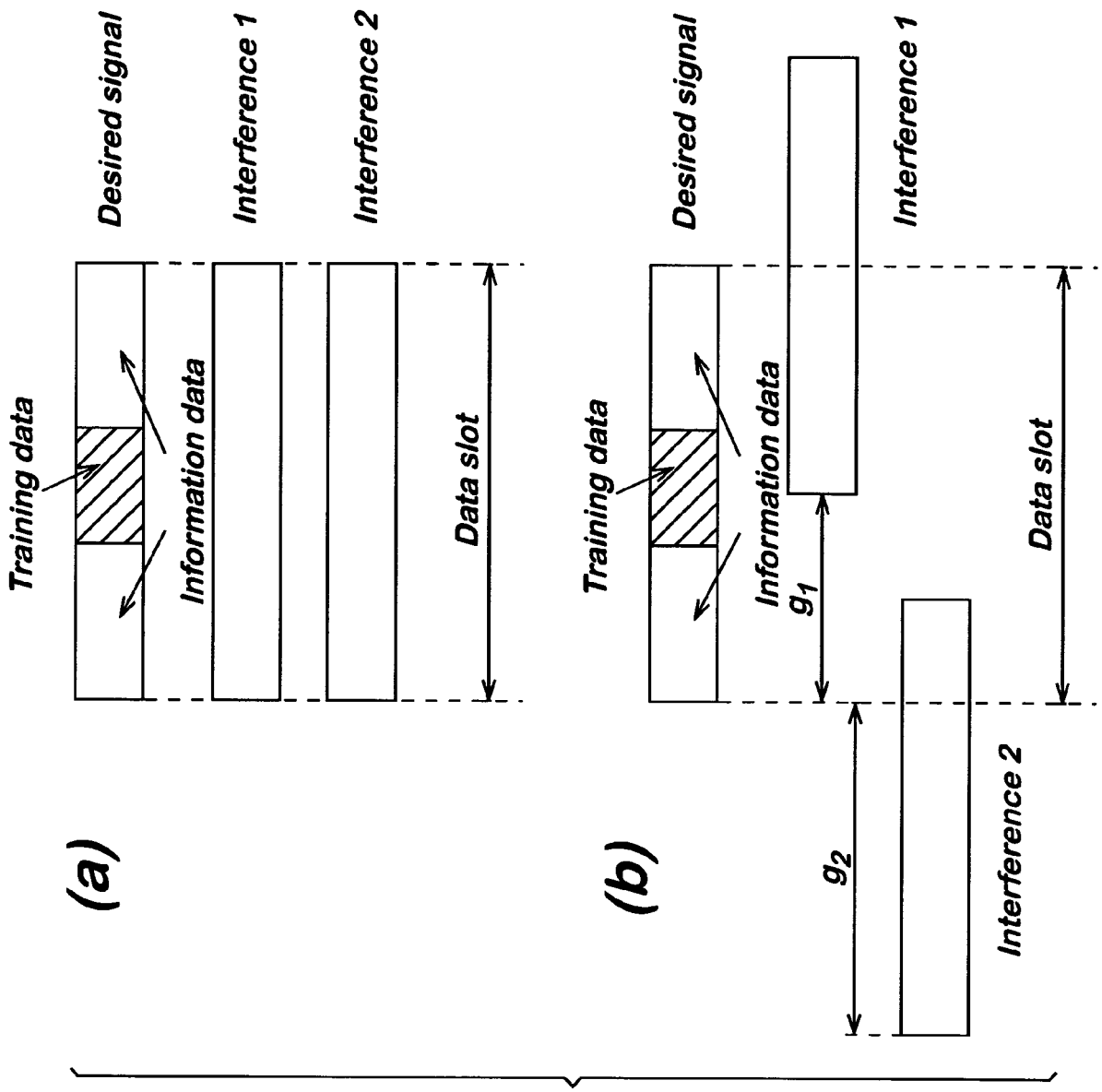
FIG. 1 is a diagram illustrating a known signal/interference scenario (prior art): a) synchronous case, b) asynchronous case
Figure 4:
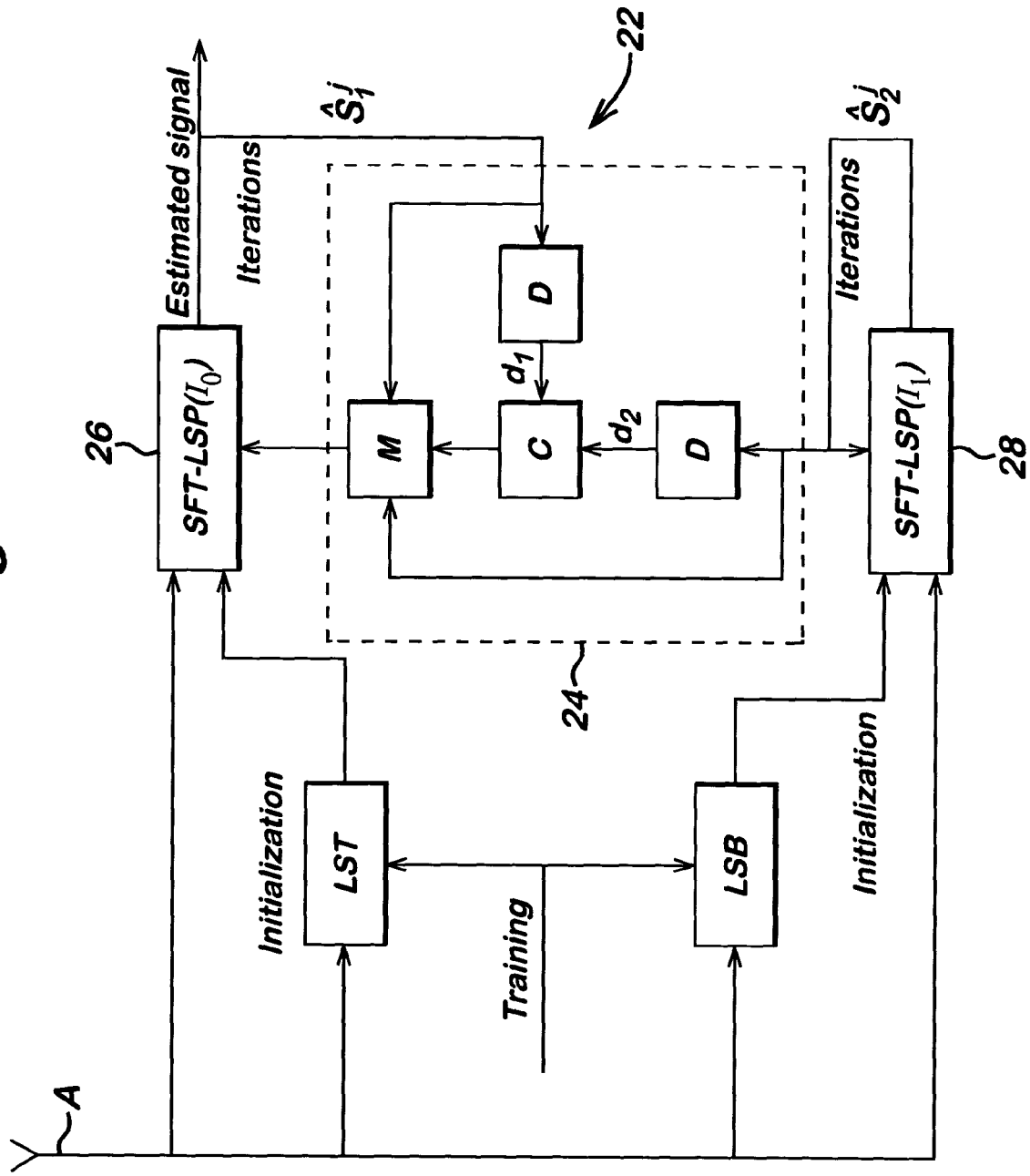
FIG. 4 is a diagram illustrating a preferred Switched (reconfigurable) receiver, FIG. 5 are graphs representing raw bit error rate (BER) versus signal to interference ratio (SIR) in the (a)synchronous and (b)asynchronous scenarios: HIPERLAN/2 "A" propagation channels, QPSK signalling, 12 symbols in a burst, 2 symbols preamble, 4 independent antennas, 2 interferences, $I_1 = 3$, $I_0 = 5$.

A preferred receiver 22 is provided with improved co-channel interference (CCI) rejection capability and is suitable for use in base stations and/or mobile terminal receivers, which are not synchronized and are equipped with antenna arrays A. Basically it can be considered that the receivers in FIGS. 2 and 3 are combined into the preferred receiver 22 by means of the Selector block 24 as shown in FIG. 4. One space time filter using least squares estimation with projections (denoted STF-LSP estimator block 26) uses initialization by least squares estimation over training data (denoted LST) and the other space time filter using least squares estimation with projections (denoted STF-LSP estimator block 28) uses initialisation from least squares estimation over the burst (denoted LSB). Each estimator block 26,28 performs $I_1$ ($I_1 \leq I_0$) iterations in parallel. After that the estimated symbols with the lower distance from the given finite alphabet (FA) are selected in the selector block 24 for the next iteration in the space time filter STF-LSP estimator block 26 having LST initialisation. The Selector block 24 is implemented as shown in FIG. 4 with the following notations:

D is the Distance from the finite alphabet (FA) estimator, which calculates the distances $d_n$ for all N estimated symbols at the $I_1$-st iteration:

$$d_n = |\hat{s}_n^{I_1} - \tilde{s}_n^{I_1}|, n=1,\ldots,N \quad \text{(Equation 5)}$$

where: $\hat{s}_n^{I_1}$ is the element of the projected vector (presented in Equation 2 above) corresponding to n-th symbol and $I_1$-st iteration, and $\tilde{s}_n^{I_1}$ is the corresponding element of the linear signal estimation $S^j = X\hat{W}^{j-1}$ before projection to the finite alphabet by a projector (slicer) which is not shown in the Figure.

C is the Comparison block, which indicates the symbol with the lower distance from the finite alphabet (FA) at its inputs at the $I_1$-st iteration.

M is the Multiplexing block, which connects the first input signal to its output for all iterations except the $I_1$-st, when it connects its input signal indicated by the Comparison block.

The algorithm of the Selector block 24 can be expressed as follows:

$$\hat{s}_n^j = s_{1n}^j, j \neq I_1, n=1,\ldots,N, \quad \text{(Equations 6, 7)}$$

$$\hat{s}_n^{I_1} = \begin{cases} \hat{s}_{1n}^{I_1} & \text{if } d_{1n} \leq d_{2n} \\ \hat{s}_{2n}^{I_1} & \text{if } d_{1n} > d_{2n} \end{cases}, n=1,\ldots,N,$$

where in those equations, index 1 corresponds to STF-LSP estimator block 26 (having LST initialisation), and index 2 corresponds to STF-LSP estimator block 28 (having LSB initialisation), as shown in FIG. 4.

The complexity of the proposed solution $\Theta_{Preferred}(I_1, I_0)$ is proportional to the total number of iterations $I_0 + I_1$, while, for comparison, the complexity of the known solutions in FIGS. 2 and 3 $\Theta_{LSP}(I_0)$ is proportional to $I_0$, e.g.

$$\Theta_{Preferred}(I_1, I_0) \approx \frac{I_1 + I_0}{I_0} \Theta_{LSP}(I_0). \quad \text{(Equation 8)}$$

One possible application of the preferred receiver is interference cancellation in Orthogonal Frequency Division Multiplexing (OFDM) systems, such as HIPERLAN/2.

Example Application

A typical interference limited scenario is an antenna array of four well-separated elements, a time-frequency slot of 14 Orthogonal Frequency Division Multiplexing (OFDM) symbols (including 2 binary preamble symbols) and 64 subcarriers. QPSK signalling and the HIPERLAN/2 propagation channel "A" are used for the desired signal and the interference. The interference is assumed to consist of two independent components, similar to the desired signal. The least squares (LS) estimator blocks 26,28 used in the receiver shown in FIG. 4 (and estimators shown in FIGS. 2 and 3 for comparison) have their filter coefficients (weights) estimated by frequency domain modelling as described below.

Weight Estimation by Frequency Domain Modelling

The following notation is used: X is the matrix of the input signals, $S_t$ is the vector of the training data, $X_t$ is the matrix of the input signals corresponded to the training data (sub-matrix of X), $\Theta\{\cdot\}$ is a projector the finite alphabet and U is the parameter-mapping matrix defined as $$U = \left\{ \exp^{-2\pi j \frac{(l-1)(g-G/2)}{L}} I_{K \times K} \right\}, l=1,\ldots,L, g=1,\ldots,G,$$

where $I_{K \times K}$ is the K×K identity matrix, K is the number of receive antennas, L is the number of subcarriers and G<L is the model order.

For the preferred receiver (shown in FIG. 4):

Performing $I_1$ iterations of the first STF-LSP estimator block 26 follows:

$$\tilde{S}_1^{I_1} = XU\hat{V}_1^{I_1}, \hat{S}_1^{I_1} = \Theta\{\tilde{S}_1^{I_1}\},$$

$$\hat{V}_1^j = (U^*X^*XU)^{-1}U^*X^*\Theta\{XU\hat{V}_1^{j-1}\}, j=1,\ldots,I_1,$$

$$\hat{V}_1^0 = (U^*X_t^*X_tU)^{-1}U^*X_t^*S_t,$$

and performing $I_1$ iterations of the second STF-LSP estimator block 28 follows:

$$\tilde{S}_2^{I_1} = XU\hat{V}_2^{I_1}, \hat{S}_2^{I_1} = \Theta\{\tilde{S}_2^{I_1}\},$$

$$\hat{V}_2^j = (U^*X^*XU)^{-1}U^*X^*\Theta\{XU\hat{V}_2^{j-1}\}, j=1,\ldots,I_1,$$

$$\hat{V}_2^0 = (N_d/N_t)(U^*X^*XU)^{-1}U^*X_t^*S_t,$$

where $N_d$ is the total number of symbols in a data slot and $N_t$ is the number of pilot symbols.

The selection rule (equation 7) is applied to form vector $\hat{S}^0$ with the following elements:

$$\hat{s}^0[l,n] = \begin{cases} \hat{s}_{LSMP}^{I_1}[l,n] & \text{if } |\tilde{s}_{LSMP}^{I_1}[l,n] - \hat{s}_{LSMP}^{I_1}[l,n]| \leq |\tilde{s}_{LSMBP}^{I_1}[l,n] - \hat{s}_{LSMBP}^{I_1}[l,n]| \\ \hat{s}_{LSMBP}^{I_1}[l,n] & \text{if } |\tilde{s}_{LSMP}^{I_1}[l,n] - \hat{s}_{LSMP}^{I_1}[l,n]| > |\tilde{s}_{LSMBP}^{I_1}[l,n] - \tilde{s}_{LSMBP}^{I_1}[l,n]| \end{cases},$$

$$\forall n, l.$$

Performing $(I_0 - I_1)$ further iterations of the first STF-LSP estimator block 26 gives:

$$\tilde{S}^j = XU\hat{V}^j, \hat{S}^j = \Theta\{\tilde{S}^j\},$$

$$\hat{V}^j = (U^*X^*XU)^{-1}U^*X^*\hat{S}^{j-1}, j=1,\ldots,I_0-I_1,$$

$$\tilde{S} = XU\hat{V}^{I_0/I_1}, \hat{S} = \Theta\{\tilde{S}\}.$$

For the comparative known receiver shown in FIG. 2, using the same notation, weight estimation follows:

$$\tilde{S}^{I_0} = XU\hat{V}^{I_0}, \hat{S}^{I_0} = \Theta\{\tilde{S}^{I_0}\},$$

$$\hat{V}^j = (U^*X^*XU)^{-1}U^*X^*\Theta\{XU\hat{V}^{j-1}\}, j=1,\ldots,I_0,$$

$$\hat{V}^0 = (U^*X_t^*X_tU)^{-1}U^*X_t^*S_t.$$

For the comparative known receiver shown in FIG. 3, using the same notation, weight estimation follows:

$$\tilde{S}^{I_0} = XU\hat{V}^{I_0}, \hat{S}^{I_0} = \Theta\{\tilde{S}^{I_0}\},$$

$$\hat{V}^j = (U^*X^*XU)^{-1}U^*X^*\Theta\{XU\hat{V}^{j-1}\}, j=1,\ldots,I_0,$$

$$\hat{V}^0 = (N_d/N_t)(U^*X^*XU)^{-1}U^*X_t^*S_t.$$

Simulation Results

Figure 5:
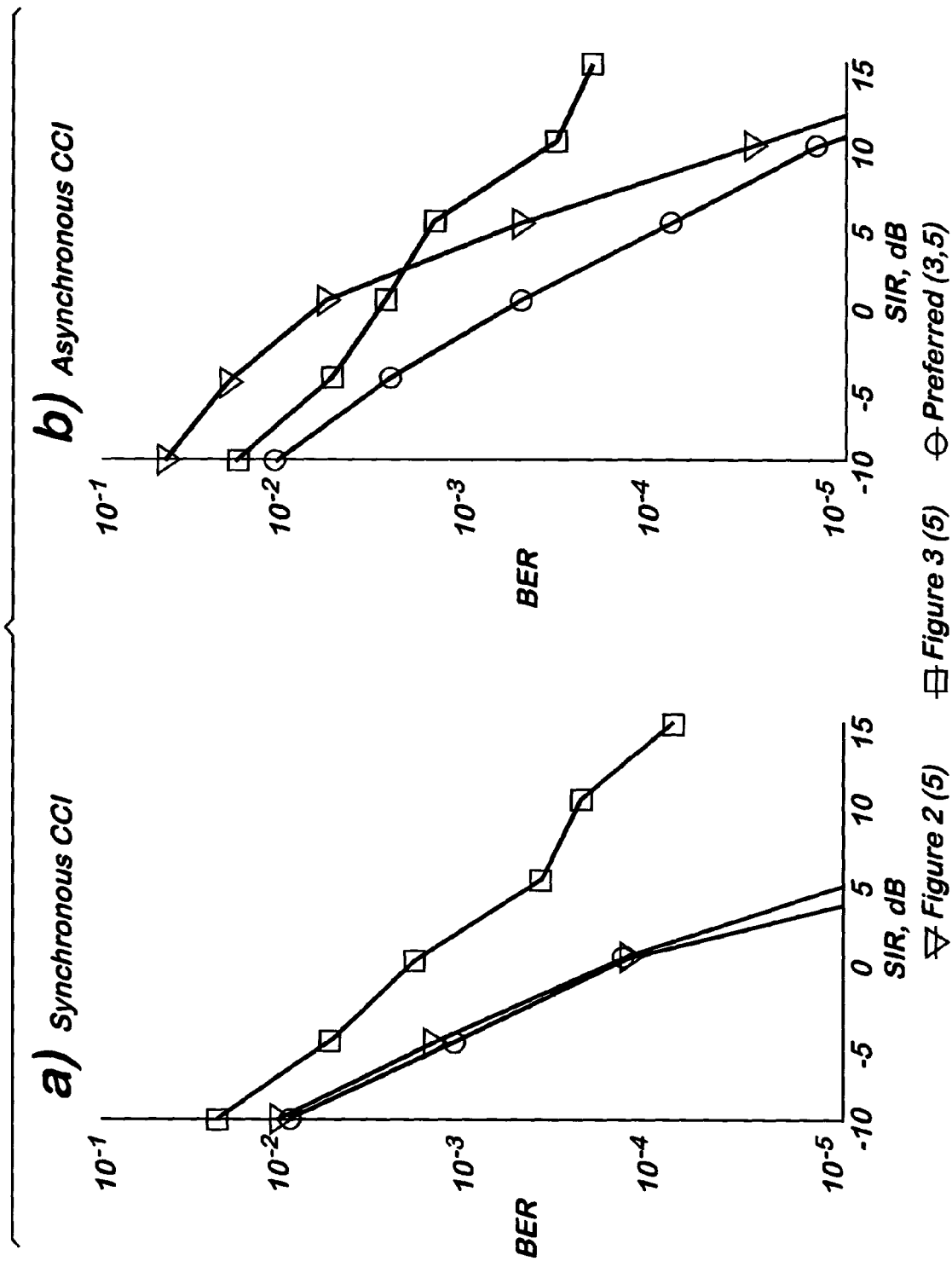

Simulation results for the example application described above (with G=12) are shown in FIG. 5. The estimated raw Bit Error Rate (BER) is plotted versus the Signal-to-Interference Ratio (SIR) for a fixed Signal-to-Noise Ratio SNR of 20 dB. (As is well-known in this field, noise refers to uncorrelated interfering pulses signals from antenna elements, whilst interference is the correlated result). In FIG. 5, the number of iterations is indicated in brackets as $I_0$ for the known solutions and as $(I_1, I_0)$ for the proposed solution, where $I_0$ denotes the total number of iterations, and for the preferred solution $I_1$ denotes the number of iterations before a selection is made (as mentioned previously). In FIG. 5(a), one can see the expected superiority of the known receiver 10 shown in FIG. 2 over the known receiver 10' shown in FIG. 3 for the whole range of the signal to interference ratio (SIR) in the synchronous case (there is no a crossing point between two curves); and the opposite behaviour of these known receivers for the low and moderate signal to interference ratio (SIR) in the asynchronous case (where there is a crossing point between two curves) can be seen in FIG. 5(b). However, significantly the preferred switched (re-configurable) receiver 22 can be seen from FIG. 5 to demonstrate the best performance in both scenarios for the whole range of the signal to interference ratio (SIR). Particularly, one can see from FIG. 5(b) that in the asynchronous case the proposed solution shows more than 5 dB and 7 dB gains respectively over the known receivers 10,10' shown in FIG. 2 and FIG. 3 at 0.1% bit error rate (BER), as well as more than 7 dB and 3 dB gains respectively at 0.5% bit error rate (BER).

FIG. 6 presents the bit error rate (BER) of the preferred receiver 22 for different $I_1$ in the asynchronous case shown in FIG. 5(b). One can see a trade off between the performance and complexity for the preferred receiver. For example, the $I_1=3$ and $I_0=5$ version gives 1 dB improvement over the $I_1=1$ and $I_0=5$ version at 0.1% bit error rate (BER). According to Equation 6, the last case requires 60% of additional complexity while the first one is only 20% more complicated compared to the known solutions shown in FIGS. 2 and 3.

The invention claimed is:

1. A receiver of digital data bursts comprising: an antenna array; a first space time filter having filter coefficients initialised by estimation over just training data in a received burst and providing symbol estimates at a first output; a second space time filter having filter coefficients initialised by estimation over the received burst and providing symbol estimates at a second output, in use at least one pass to determine a symbol estimate in the received burst being undertaken by each space time filter; and a selector arranged to use the symbol estimates from the first and second outputs to determine which of the first and second filters provides the symbol estimate closer to an expected value.

2. A receiver according to claim 1, in which the filter giving the symbol estimate closer to the expected value is selected by the selector to continue with at least one further pass to provide an updated symbol estimate to a projector to a finite alphabet so as to enable a decision as to the identity of that symbol to be made.

3. A receiver according to claim 1 or claim 2, in which for each new received burst, both filters perform at least one pass to determine a respective symbol estimate in the received burst, and the selector operates to determine which of the first and second filters provides the symbol estimate closer to an expected value.

4. A receiver according to claim 3, in which the estimation by the first filter and the second filter is least squares estimation.

5. A terminal for mobile telecommunications according to claim 4 which is a base station or a mobile user terminal.

6. A terminal according to claim 4, operative to receive data bursts sent using Orthogonal Frequency Division Multiplexing (OFDM).

7. A terminal according to claim 4, operative to receive data bursts sent using Time Division Multiple Access (TDMA).

8. A receiver according to claims 1 or 2, in which the estimation by the first filter and the second filter is least squares estimation.

9. A terminal for mobile telecommunications according to claim 8 which is a base station or a mobile user terminal.

10. A terminal according to claim 8, operative to receive data bursts sent using Orthogonal Frequency Division Multiplexing (OFDM).

11. A terminal according to claim 8, operative to receive data bursts sent using Time Division Multiple Access (TDMA).

12. A terminal for mobile telecommunications comprising a receiver according to claims 1 or 2.

13. A terminal for mobile telecommunications according to claim 12 which is a base station or a mobile user terminal.

14. A terminal according to claim 12, operative to receive data bursts sent using Orthogonal Frequency Division Multiplexing (OFDM).

15. A terminal according to claim 12, operative to receive data bursts sent using Time Division Multiple Access (TDMA).

16. A method of receiving digital data bursts using a receiver comprising: an antenna array, a first space time filter having filter coefficients initialised by estimation over just training data in a received burst and providing symbol estimates at a first output and a second space time filter having filter coefficients initialised by estimation over the received burst and providing symbol estimates at a second output, at least one pass to determine a symbol estimate in the received burst being undertaken by each space time filter, and a selector using the symbol estimates from the first and second outputs to determine which of the first and second filters provides the symbol estimate closer to an expected value.

* * * * *